Aug. 23, 1932.  E. W. BLEAM  1,872,656
MEAT SAWING APPARATUS
Filed Sept. 19, 1931  3 Sheets-Sheet 3
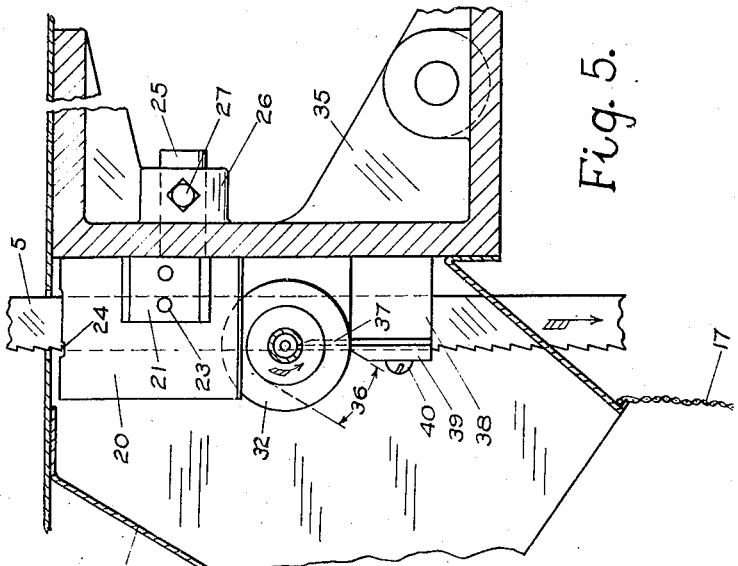
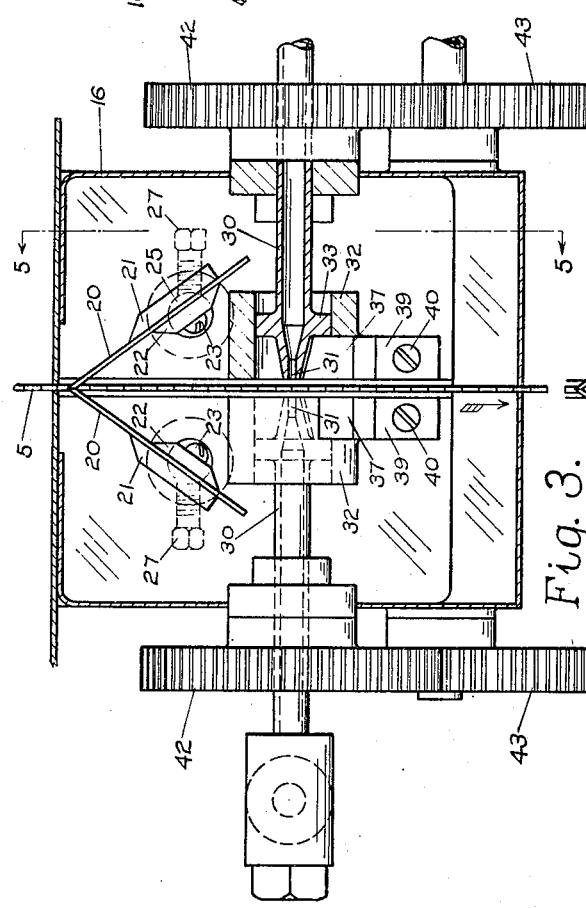
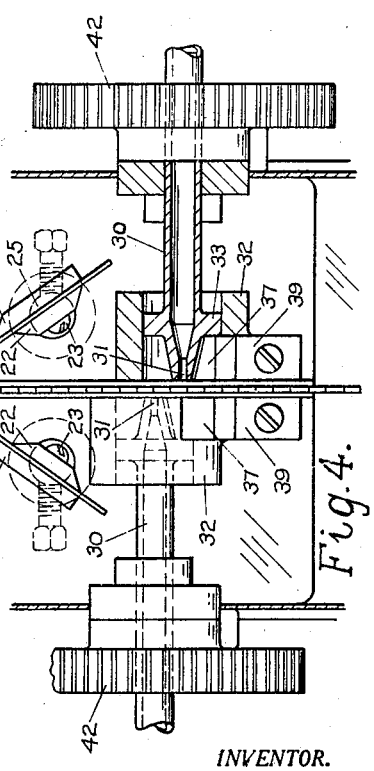
INVENTOR.
Edgar W. Bleam,
BY
Cornelius A. Ehret
his ATTORNEY.

Patented Aug. 23, 1932

1,872,656

UNITED STATES PATENT OFFICE

EDGAR W. BLEAM, OF PHILADELPHIA, PENNSYLVANIA, ASSIGNOR TO ATLAS MANUFACTURING COMPANY, A CORPORATION OF DELAWARE

MEAT SAWING APPARATUS

Application filed September 19, 1931. Serial No. 563,872.

My invention relates generally to sawing apparatus, and more particularly to apparatus adapted for sawing meats.

In accordance with my invention, one or more nozzles for delivering a blast, as of air, to remove the adhering material from the saw, and particularly from the gullets of the saw teeth, are caused to revolve to prevent particles thrown off by the air blasts from adhering to the surface of the nozzle and accumulating adjacent the saw blade, and more specifically scraper structure engages the surface of the revolving nozzle to insure the positive removal of any accumulation thereon.

Further in accordance with my invention, the air blasts from the revolving nozzles engage the saw blade and the gullets of the teeth in a direction which is normal to the side faces of the blade, and preferably the air blasts and nozzles are closely confined by a housing so that the dispersion of the removed material by the air blasts will be limited to a very small zone.

Further in accordance with one form of my invention, the air blasts are in opposition to each other and combine at the gullets of the teeth, while in another form, the air blasts are staggered longitudinally along the saw blade successively to engage the same.

In meat sawing apparatus the grease on the saw blade and its pulleys, about which it passes, and also changes in thrust or tension on the blade occurring in operation, give the blade a tendency to walk off the pulleys, in the direction of the teeth of the blade, and I provide a flange member which engages the teeth, when necessary, to give the blade a thrust and cause its return to its proper track or position on the pulleys.

My invention further resides in the features of combination, construction and arrangement hereinafter described and claimed.

For an understanding of my invention and for an illustration of some of the forms it may take, reference is to be had to the accompanying drawings in which:

Fig. 3 is an enlarged front elevation, partly in section, of the cleaning apparatus.

Fig. 4 is a front elevation, partly in section, of a modified form of the cleaning apparatus.

Fig. 5 is a side view taken along the line 5—5 of Fig. 3.

In a machine for sawing meats the apparatus must cut the meat without leaving any residue from the blade of the saw thereon, so that the meat will not require wiping or cleaning after sawing. The cleaning of such blades is extremely difficult due to the fact that small ligaments or stringy bits of meat, and the fats present in meat, have a tendency to cling to the saw blade, the former gathering in the throats or gullets of the saw teeth, and the latter collecting upon the side faces of the blade. If this accumulation is not continuously removed from the blade, not only will the particles clinging in the teeth of the blade interfere with the actual cutting operation, but the meat cut by the blade will be smeared across its face with fatty accumulations at the side of the blade and will be unattractive in appearance and therefore unsaleable until after a cleaning operation. It is therefore important to dispose of the removed material and confine it in such manner as to prevent it from returning to the saw blade. In the interests of sanitation it is also important to prevent the material from being thrown about the interior of the base of the machine in which the removal takes place.

Figure 1:
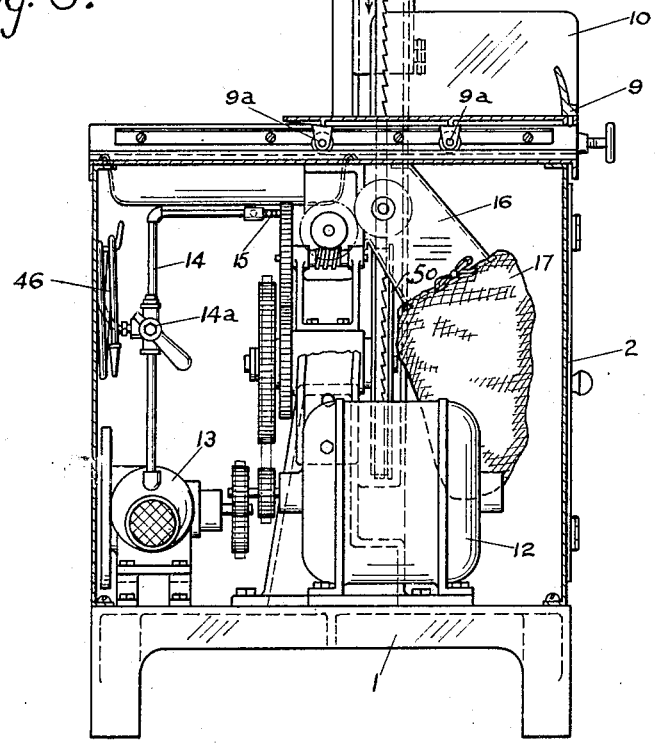
Fig. 1 is a side elevational view, partly in section of a meat cutting machine constructed in accordance with my invention.
Figure 2:
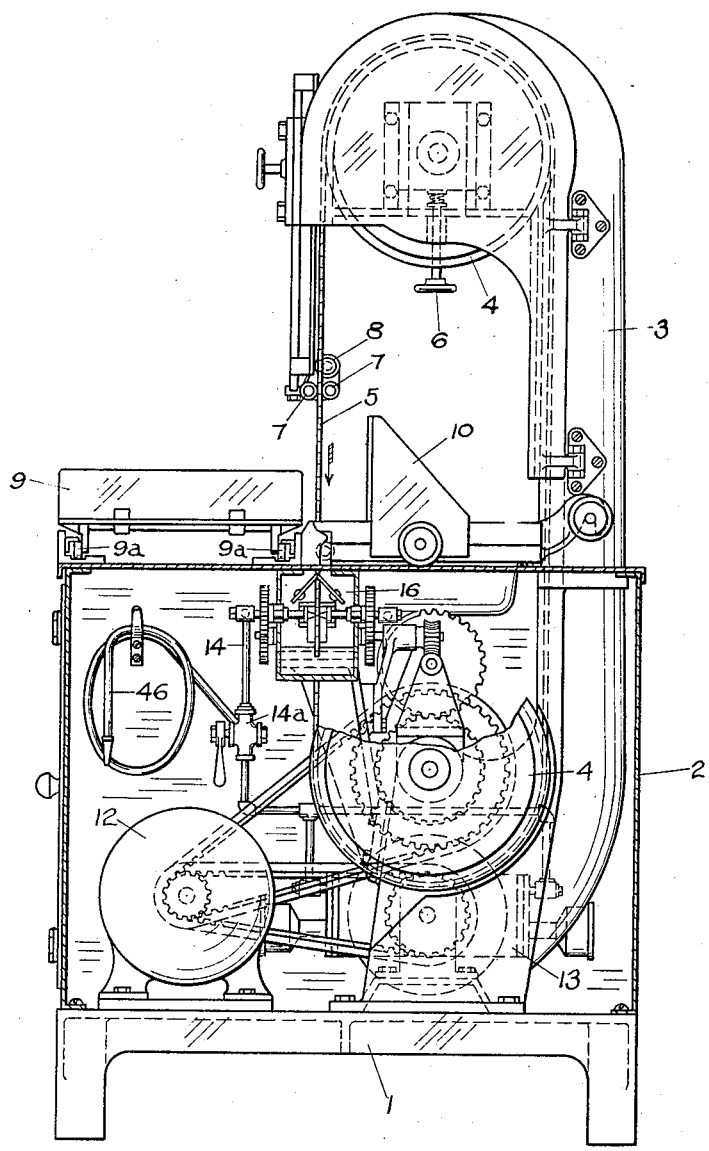
Fig. 2 is a front elevational view, partly in section, of the machine shown in Fig. 1.

Referring to the drawings, particularly Figs. 1 and 2, the reference numeral 1 generally designates a base supporting directly a compartment 2 and a standard 3 which carries a pair of wheels or pulleys 4, about which operates a band saw 5. The upper wheel is made adjustable, as by a hand wheel 6, so that the saw may be maintained under proper tension, and the saw is equipped with the usual side and back tension thrusts as indicated at 7 and 8 respectively. Upon the upper surface of the compartment 2 a carriage 9 for carrying the meat to be cut is mounted on rollers 9a for permitting the carriage to travel in a path parallel to the side faces of the saw blade. An adjustable stop or gage 10 is provided, against which the end of the meat will abut to regulate the thickness of the cuts.

Within the compartment 2 there is disposed an electric motor 12 connected to the saw in any suitable manner, as by the gears and belt drive shown, for driving the saw blade in the direction indicated by the arrows, and also for operating the air compressor 13, which by means of the air line 14 and the flexible hoses 15 (shown more clearly in Fig. 6) supply compressed air to the cleaning mechanism for removing material adhering to the saw blade in the manner hereinafter explained. The cleaning apparatus is generally designated at 16, and more clearly illustrated in Figs. 3 to 6 inclusive. A porous receptacle 17 for receiving the removed material is fastened to the discharge end of the cleaning apparatus.

Fig. 3 is an enlarged view of the saw cleaning apparatus, partly in section, and Fig. 5 is a side view taken along the line 5—5 of Fig. 3. The apparatus comprises a pair of scrapers 20 which operate in combination with air blasts from the nozzles 30 positioned below the scrapers to remove the adhering particles and material from the blade. The scrapers are firmly secured between plates 21 and 22 by means of screws 23. The edges of the scrapers meet to form a continuous surface to the front and rear of the saw so that material removed from the saw by the scraper edges cannot readily fall into the path of movement of the saw and again come into contact with the blade, but each has a cutaway portion as indicated at 24 in Fig. 5 such that the scraper does not engage the saw teeth, but comes into active engagement with the saw blade at a point just rearwardly of the gullets of the teeth and extending to the rear edge of the blade. The scrapers thus remove substantially all of the particles clinging to the side faces of the saw, which particles fall down the inclined surfaces of the scrapers, through the opening of 16 and into the receptacle 17 below. The plate 22 terminates in a round shaft 25 which is supported in a bearing 26, and by means of the set screw 27 the position and degree of contact of the scrapers with respect to the saw blade can be adjusted.

There may still remain, however, ligaments or stringy bits of meat or other material which have hung in the gullets of the teeth, and blasts of air, or equivalent fluid means, are directed against the blade so as to remove the remaining material. The scrapers 20 engage the saw just rearwardly of the gullets of the saw teeth and serve to disturb the overhanging ends of the ligaments and cause them to stand out so that they may be the more effectively engaged by the fluid jets.

The air jet mechanism comprises two nozzles 30 on either side of the blade which direct blasts of air from the compressor 13 in a direction normal to the surface of the blade and engage the latter just rearwardly of the gullets of the teeth to act upon the strands dislodged by the scraper blades to force them from the gullets and carry them away from the saw. The jets or blasts operate with considerable force being produced through small orifices 31 at a substantial pressure. The two jets in the arrangement of Fig. 3 are directly opposed to each other, and thus blast away the remaining adhering particles directly from each side of the blade.

Figure 6:
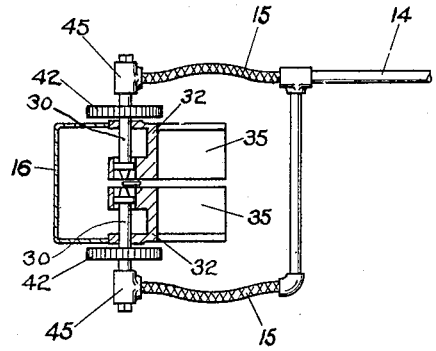
Fig. 6 is a plan view, partly in section, of a portion of the cleaning apparatus.

In order to restrict the dispersion of the removed material to a small zone, the delivery ends of the nozzles are enclosed in cylindrical housings 32 on either side of the blade, one end of each of the housings being adjacent the blades and the opposite end of each being closed by extensions 33 from the nozzles. In Figs. 3 and 4 the housings on the right of the saw blade and the corresponding nozzles are shown in section. The housing may be cast integral with the frame members 35, as shown in Fig. 6, or may comprise separate members mounted on the frame. The housing has an opening as indicated at 36 in Fig. 5 through which the removed material falls or is blown by the air blasts into the porous receptacle 17. The receptacle is sufficiently porous to permit the ready escape of the air, but retains the removed material, and is adapted to be readily removable from the cleaning apparatus in order to empty the same whenever necessary or desirable.

Due to the adhesive nature of the removed material there is a tendency for it to accumulate on the nozzles adjacent the saw blade, and if this is not prevented the material may accumulate to such an extent that it will re-engage the blade. Since this may occur at a point below the nozzles and therefore not be subject to removal by the air blasts, the saw blade will not be clean when it engages the meat and the latter will be smeared thereby. In order to prevent this accumulation the nozzles 30 are caused to rotate by means of gears 42 and 43 which are driven through a gear train by the motor 12, as shown in Figs. 1 and 2. Entering through the opening 36 of the housing and engaging the nozzles are scrapers 37 (Figs. 3 to 5) on either side of the saw blade, the scrapers being secured to the base 38 by means of the plate 39 and screws 40. The enclosed ends of the scrapers are tapered to form complemental surfaces with the tapered ends of the nozzles, and as the nozzles revolve, the scrapers remove any material adhering thereto, the removed material passing or being blown out through the opening 36.

Fig. 6 is a plan view of the rotating nozzles and shows how the compressed air is delivered thereto from the supply line 14 by means of flexible connections 15 and hollow end couplings 45 in which the nozzles rotate.

It is necessary to clean the various parts of the machine from time to time, and this may be conveniently done by means of an air blast from the flexible hose 46 which is normally coiled within the compartment 2. By manipulation of the two-way valve 14a, the air blast to the revolving nozzles may be cut off, and air supplied to the hose 46 which may be manually used to blow out debris clinging to any part of the apparatus.

Fig. 4 shows a modification of the cleaning apparatus in which the nozzles 30 are out of registry with respect to each other so that the saw blade successively passes two air blasts, instead of having the air blasts in opposition as in the construction of Fig. 3. In the modification of Fig. 4 it will be seen that the housings 32 and the bearings for the nozzles 30 are likewise out of registry.

Figure 7:
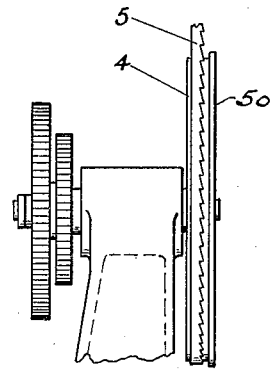
Fig. 7 is a detail of the lower pulley of Figs. 1 and 2.

The grease on the saw blade, due to its contact with the meat, causes the wheels or pulleys 4 to also become greasy and the blade has a tendency to walk off the pulleys in the direction of the teeth of the blade. Also, a change in thrust or tension on the blade, as at the instant a cut is finished, may cause walking of the blade in this direction. In order to prevent this, and also to cause the blade to travel in its proper track on the crown of the pulleys, a flange 50 is formed on the pulleys, preferably the lower pulley 4, as shown in detail in Fig. 7, which flange engages the teeth of the blade 5 when the latter has walked toward the flange, and gives a light thrust to the blade, thereby causing it to return to its proper position on the pulley. Since the flange 50 and the saw blade are traveling at the same speed, and as the coefficient of friction is very low between the blade and pulley at the speed traveled, a light thrust only is required to return the blade to its proper position, and the teeth are not dulled or damaged by their contact with the flange. I have found that a satisfactory position for the flange is on the lower pulley, and that it is not necessary to use a corresponding flange on the upper pulley. The use of a flange on one pulley only is advantageous in that it does not prevent ready removal of the blade, when desired.

What I claim is:

1. In meat sawing apparatus, and in combination with a saw blade and means for supporting and driving the same, means for directing a fluid blast against the blade to remove particles from the teeth of the blade, and means engaging the said last-named means for removing particles accumulating thereon.

2. In meat sawing apparatus, and in combination with a saw blade and means for supporting and driving the same, means for directing a fluid blast against the blade to remove particles from the teeth of the blade, and a scraper engaging the said last-named means for removing particles accumulating thereon.

3. In meat sawing apparatus, and in combination with a saw blade and means for supporting and driving the same, means for directing a fluid blast against the blade to remove particles adhering to the teeth of the blade, scraper structure engaging the said means for removing particles accumulating thereon, and a housing enclosing said means to prevent the dispersion of the removed particles to other parts of the apparatus.

4. In meat sawing apparatus, and in combination with a saw blade and means for supporting and driving the same, revolving means for directing a fluid blast against the blade to remove particles adhering to the teeth of the blade, and scraper structure engaging said revolving means for removing particles accumulating thereon.

5. In meat sawing apparatus, and in combination with a saw blade and means for supporting and driving the same, revolving means for directing a fluid blast against the blade to remove particles adhering to the teeth of the blade, and a fixed scraper engaging said revolving means for removing particles accumulating thereon.

6. In meat sawing apparatus, and in combination with a saw blade and means for supporting and driving the same, a revolving nozzle for directing a fluid blast against the blade to remove particles adhering to the teeth of the blade.

7. In meat sawing apparatus, and in combination with a saw blade and means for supporting and driving the same, a revolving nozzle for directing a fluid blast against the blade to remove particles adhering to the teeth of the blade, and a fixed scraper having one end engaging the exterior surface of the revolving nozzle for removing particles accumulating thereon.

8. In meat sawing apparatus, and in combination with a saw blade and means for supporting and driving the same, a revolving nozzle for directing an air blast against the blade to remove particles adhering to the teeth of the blade and having an exterior tapered surface, and a fixed scraper having a complementary tapered portion engaging the exterior surface of the revolving nozzle for removing particles accumulating thereon.

9. In meat sawing apparatus, and in combination with a saw blade and means for supporting and driving the same, a revolving nozzle for directing an air blast against the blade to remove particles adhering to the teeth of the blade, a fixed scraper having a complementary edge engaging the exterior surface of the nozzle for removing particles accumulating thereon, and a fixed housing enclosing the nozzle and edge of the scraper to prevent the dispersion of the removed particles to other parts of the apparatus.

10. In meat sawing apparatus, and in combination with a saw blade and means for supporting and driving the same, a revolving nozzle for directing an air blast against the blade to remove particles adhering to the teeth of the blade, a scraper engaging the exterior surface of the nozzle for removing particles accumulating thereon, and a fixed housing enclosing the nozzle and scraper, said housing providing a bearing for the revolving nozzle.

11. In meat sawing apparatus, and in combination with a saw blade and means for supporting and driving the same, revolving nozzles on each side of the blade for directing air blasts against the blade to remove particles adhering to the teeth thereof, scraper means engaging the exterior surfaces of the revolving nozzles to remove particles accumulating thereon, and a fixed housing on either side of the blade enclosing the revolving nozzles and comprising a bearing therefor.

12. In meat sawing apparatus, and in combination with a saw blade and means for supporting and driving the same, a revolving nozzle for directing an air blast against the blade to remove particles adhering to the teeth of the blade, a scraper engaging the exterior surface of the nozzle for removing particles accumulating thereon, a housing surrounding said nozzle to prevent the dispersion of the removed particles, an opening in the housing through which the removed particles pass, and a receptacle in communication with said opening for collecting and retaining said removed particles.

13. In meat sawing apparatus, and in combination with a saw blade and means for supporting and driving the same, nozzles on each side of the blade for directing fluid blasts against the gullets of the teeth, the blasts being in opposed relation with respect to each other to remove particles adhering to the teeth of the blade, and means closely surrounding and enclosing said nozzles in the zone adjacent the saw blade to prevent dispersion of the removed particles.

14. In meat sawing apparatus, and in combination with a saw blade and means for supporting and driving the same, revolving nozzles on each side of the blade for directing fluid blasts against the gullets of the teeth, the blasts being in opposed relation with respect to each other to remove particles adhering to the teeth of the blade, and means enclosing said nozzles to prevent dispersion of the removed particles.

15. In meat sawing apparatus, and in combination with a saw blade and means for supporting and driving the same, revolving nozzles on each side of the blade for directing fluid blasts against the blade in a direction normal to the surface of the blade to remove particles adhering to the teeth of the blade, and means enclosing said nozzles to prevent dispersion of the removed particles.

16. In meat sawing apparatus, and in combination with a saw blade and means for supporting and driving the same, a plurality of means out of registry with respect to each other for directing air blasts successively against the blade in the direction of its travel to remove particles adhering to the teeth of the blade, said air blasts having a direction normal to the side of the blade.

17. In meat sawing apparatus, and in combination with a saw blade and means for supporting and driving the same, revolving nozzles on either side of the blade for directing air blasts against the blade in a direction normal to the surface thereof, said nozzles being out of registry with respect to each other so that the air blasts will successively engage the blade in the direction of its travel.

18. In meat sawing apparatus, and in combination with a saw blade and means for supporting and driving the same, revolving nozzles on either side of the blade for directing an air blast against the blade to remove particles adhering to the teeth of the blade, gears at the ends of each nozzle engaging a driving unit, and scrapers engaging the exterior surfaces of each of said nozzles for removing particles accumulating thereon.

19. In meat sawing apparatus, and in combination with a saw blade and means for supporting and driving the same, revolving nozzles on either side of the blade for directing fluid blasts against the blade to remove particles adhering to the teeth of the blade, each of said nozzles having a gear at its end for engaging a driving unit, and driving gears mounted on a common shaft for engaging the first named gears.

20. In meat sawing apparatus, and in combination with a saw blade and means for supporting and driving the same, revolving nozzles on either side of the blade for directing air blasts against the blade to remove particles adhering to the teeth of the blade, and means for causing said nozzles to rotate in the same direction with respect to each other.

21. In meat sawing apparatus, and in combination with a saw blade and means for supporting and driving the same, revolving nozzles on either side of the blade for directing air blasts against the blade to remove particles adhering to the teeth thereof, scraper means engaging the exterior surfaces of said nozzles for removing particles accumulating thereon, a housing enclosing said nozzles for preventing the dispersion of the removed particles, an opening in said housing through which the removed particles pass, and a receptacle covering said opening having a porous wall permitting passage of the air blasts but retaining the removed particles.

EDGAR W. BLEAM.